Feb. 1, 1966  R. H. KRESS  3,232,634
VEHICLE SUSPENSION SYSTEM
Filed Aug. 2, 1962  3 Sheets-Sheet 1
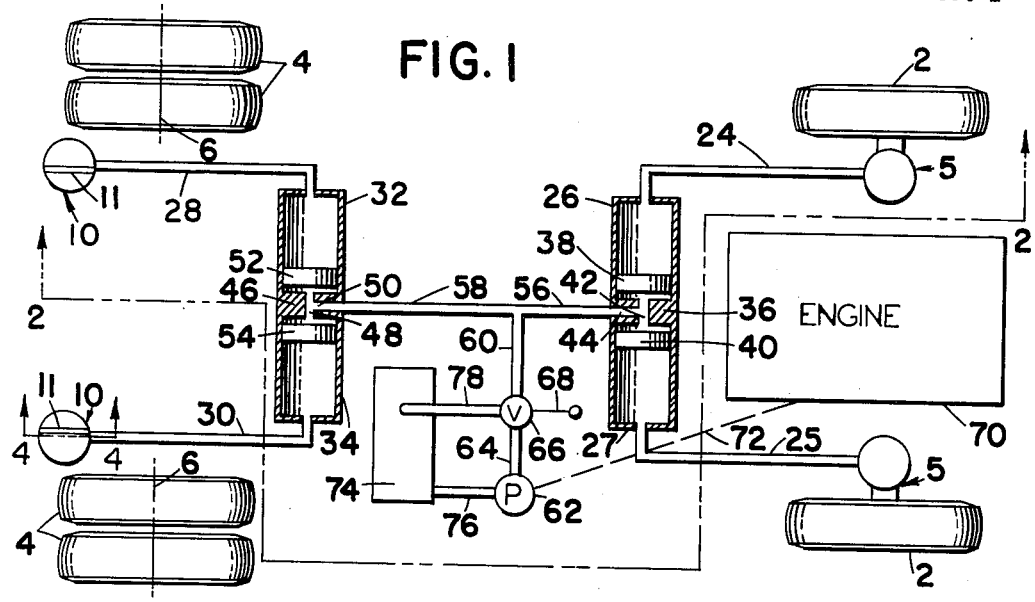
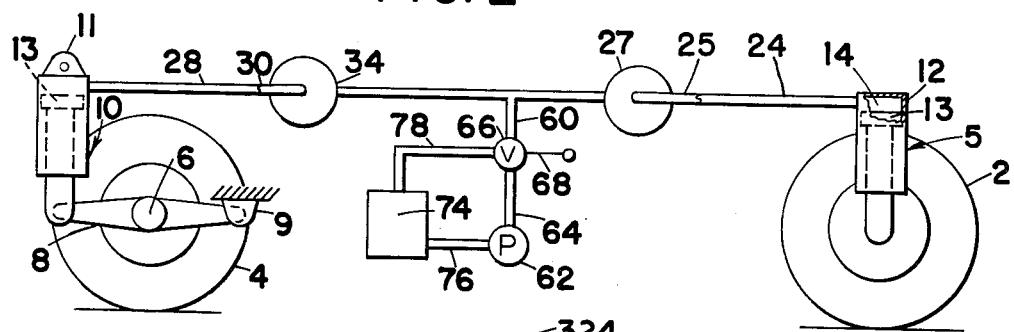
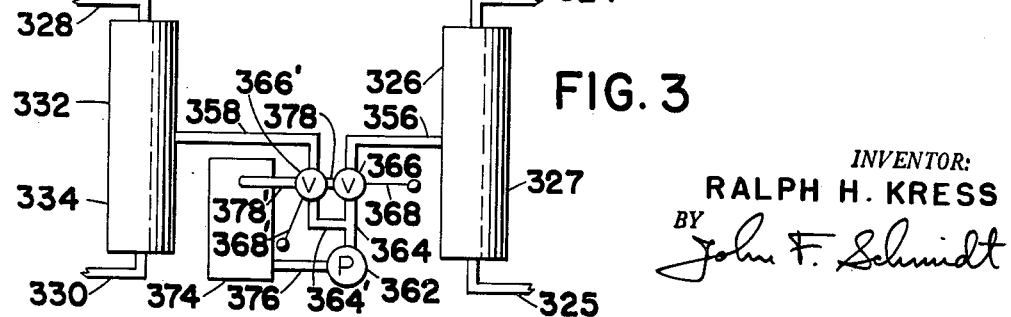
INVENTOR:
RALPH H. KRESS
BY John F. Schmidt

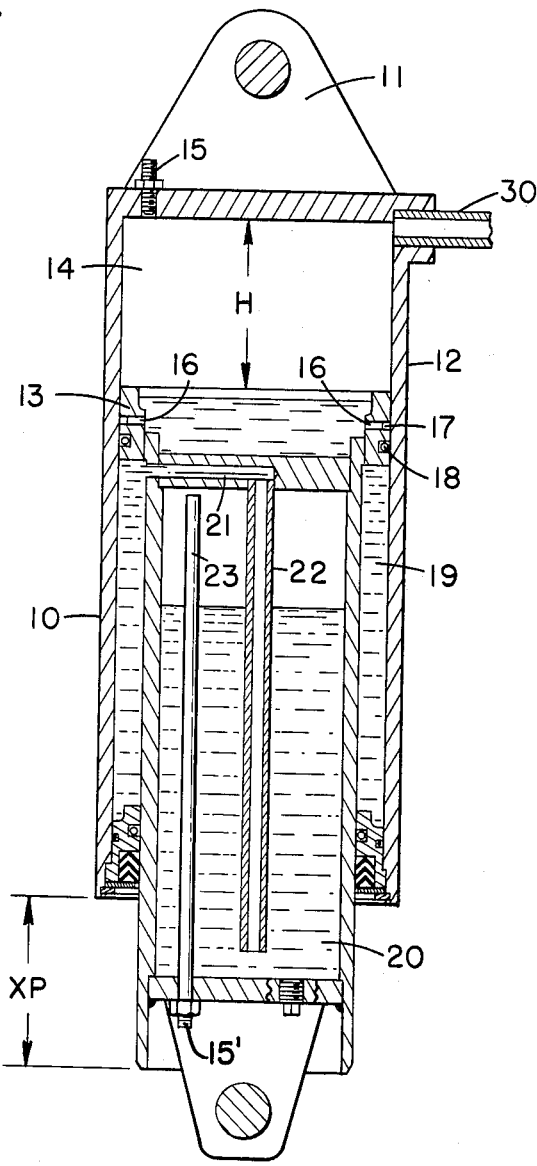

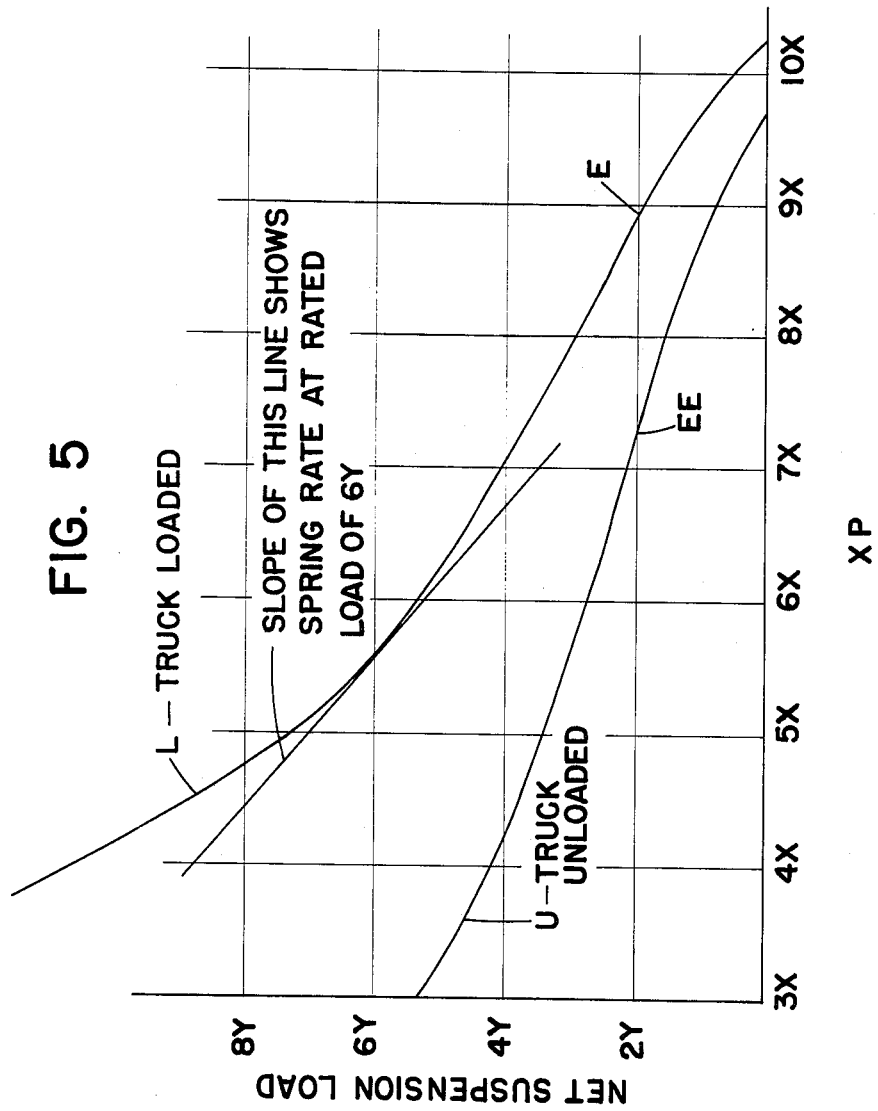

United States Patent Office 3,232,634
Patented Feb. 1, 1966

3,232,634
VEHICLE SUSPENSION SYSTEM
Ralph H. Kress, Peoria, Ill., assignor to LeTourneau-Westinghouse Company, Peoria, Ill., a corporation of Illinois
Filed Aug. 2, 1962, Ser. No. 214,238
3 Claims. (Cl. 280—104)

This invention relates to vehicle suspension systems, particularly to suspension systems using a suspension device of the type disclosed and claimed in my Patents 2,914,337, 2,914,338 and 3,014,739, issued November 24, 1959, November 24, 1959, and December 26, 1961, respectively.

A problem of long standing in the design of vehicle suspension systems, especially as applied to trucks, is the problem of a suspension device which will be satisfactory when the vehicle is running unloaded as well as when the vehicle runs loaded. Generally speaking, suspension devices designed to give proper ride characteristics for one extreme are not likely to be of the right design for the other extreme. As a result, most suspension devices are likely to be a compromise in which the ride characteristics are not entirely satisfactory with the vehicle empty or with the vehicle fully loaded.

It is an object of this invention to provide a vehicle suspension system in which a compressible fluid supports the load on the wheel and in which the pressure of the compressible fluid is variable to a considerable extent at the will of the operator.

In the drawings:

FIG. 1 is a largely schematic view in plan of a vehicle embodying a suspension system made according to this invention, with parts broken away and in section.

FIG. 2 is a view in section, again largely schematic, substantially on line 2—2 of FIG. 1; it may be pointed out here that FIG. 2 shows more of the rear wheel suspension than FIG. 1 shows.

FIG. 3 is a partial view similar to the view shown in FIG. 1, but illustrating a modification of the invention;

FIG. 4 is a view in section through one of the rear suspension devices, being a section substantially on line 3—3 of FIG. 1 but on a larger scale than FIG. 1; and FIG. 5 shows two graphs illustrating what happens in the operation of a vehicle having a suspension system made according to this invention.

It will be understood that details of connecting the individual suspension devices to the vehicle basic supporting structure and to the wheels do not form any part of this invention. Such details are shown in my three patents identified above and recourse may be had thereto for the specific mounting details. Thus, my Patent 2,914,337, particularly in FIGS. 2 and 3, shows details by which the front wheel suspensions may be mounted, while my Patent 3,014,739 (especially FIGS. 5 and 6, or FIGS. 1 and 7) shows details by which the rear suspensions may be mounted.

Reference will be made in this description of the invention to a "basic supporting structure" of a vehicle. This expression is used in preference to the word "frame" because not all vehicles today are provided with frames. Examples are the so-called "unit body" structures as pioneered by the Nash automobiles of some years ago. Other examples are sometimes referred to as vehicles having an exoskeletal structure.

With the foregoing as background information, it will be noted that the vehicle shown schematically in FIG. 1 is provided with dirigible front wheels 2 and rear wheels 4. Front wheels 2 can be dirigibly mounted by means of suspension devices 5 as shown in my Patent 2,914,337, and rear wheels 4 may be mounted for rotation about an axis 6 between the ends of a beam 8 (FIG. 2); one end of beam 8 is pivotally secured to a mounting bracket 9 carried by the basic supporting structure, while the other end of beam 8 is supported in relation to the basic supporting structure by a suspension device 10 provided at its upper end with a mounting bracket 11. The details of the means by which brackets 11 of the suspension devices are secured are not shown here because those details form no part of this invention. The means for driving the vehicle form no part of this invention, and it will be understood by those skilled in the art that any one of a number of suitable means may be used to accomplish drive of the vehicle. An example of such means may be found by reference to my Patent 3,014,739, already referred to above.

As is best seen in FIG. 4, each suspension unit is an expansible chamber device of the piston-and-cylinder type, having a cylinder 12 and a piston 13 which define a load-supporting expansible chamber 14. As will be understood by those skilled in the art from reference to my three patents identified above, the chamber 14 is charged with a compressible fluid through a suitable charging valve 15.

Piston 13 is constructed with an oil reservoir in its upper surface. Oil in the reservoir is given access to the internal surface of cylinder 12 by means of drilled passages 16 and an annular groove 17 in the external cylindrical surface of piston 13. The piston is suitably packed, as for example by means of an O-ring 18, disposed in a groove in the outer surface of the piston, to seal the space above the piston from the space below the piston.

The annular space 19 below the piston is charged with an incompressible fluid and is at all times in communication with a reservoir 20 in the hollow piston rod. A quantity of said incompressible fluid ((preferably the same kind of oil as in the reservoir in the top of the piston) is in the reservoir 20, and the space above the incompressible fluid is charged with the same compressible fluid as is present in the load-supporting chamber 14. Space 19 communicates with reservoir 20 by means of a passage 21 in the piston and a conduit 22 which dips into the oil in reservoir 20, the quantity of oil being such that the lower end of conduit 22 is at all times below the liquid level of the oil.

A conduit 23 extends from the lower end closure of the piston rod to a point that is always above the liquid level of the oil in reservoir 20. A charging valve 15' in the lower end of conduit 23 allows ready control of the fluid pressure in reservoir 20 by permitting easy release of incompressible fluid to reduce that pressure or the easy addition of more compressible fluid to increase the pressure.

With chamber 19 and the hollow piston rod pressurized, chamber 19 opposes the load-supporting chamber 14—i.e., not only must the pressure in chamber 14 support the load on that suspension device, it must also overcome the upward push of pressure acting on the lower side (the annular surface) of piston 13.

The front suspension devices 5 are shown as having fluid conduits 24 and 25 connecting their load-supporting chambers with pressure control devices 26 and 27 respectively. Similarly, the load-supporting chambers of suspension devices 10 are connected by means of fluid conduits 28 and 30 with other pressure control devices 32 and 34 respectively.

As here shown, the pressure control devices 26 and 27 are made up of one cylinder having a partition 36 fixed substantially midway between the ends thereof. Partition 36 thus divides the single cylinder into the two control devices or cylindrical enclosures 26 and 27. A piston 38 is mounted in device 26 for free reciprocation therein and a similar piston 40 is mounted for reciprocation in control device 27. Partition 36 is axially and radially bored as shown at 42 and 44 respectively.

In like manner, pressure control devices 32 and 34 comprise, as here shown, a single cylinder divided into two chambers or cylindrical enclosures by a fixed partition 46 which is axially and radially bored as shown at 48 and 50 respectively. Pistons 52 and 54 are provided to reciprocate in devices 32 and 34 respectively.

As shown in the drawings, pistons 38, 40, 52 and 54 are spaced slightly from their respective adjacent partitions 36 and 46. It will be understood that this spacing is here provided for the sake of clarity of the disclosure. In normal operation, one operating position of the pistons is the position they occupy closely adjacent to or in contact with the partitions 36 and 46.

Radial bore 44 of partition 36 is connected with a fluid conduit 56, and radial bore 50 of partition 46 is connected with a fluid conduit 58. Conduits 56 and 58 are connected with a conduit 60 which is connected to receive fluid under pressure from a suitable source 62 through a fluid conduit 64 and a suitable valve 66. Valve 66 is adapted to be operated by a lever 68. The pressure source 62 is here shown as a pump connected to be driven by the vehicle power plant or engine 70. The drive for pump 62 is here shown schematically as dotted line 72, and it will be understood that the drive 72 may be any one of a large number of suitable drives. Pump 62 is connected to receive fluid from a reservoir 74 through a conduit 76. Valve 66 is connected to discharge spent fluid to reservoir 74 by means of a conduit 78.

The embodiment of FIG. 3

Passing now to a description of the embodiment of the invention shown in FIG. 3, it will be understood that the parts not shown in FIG. 3 are the same as in FIG. 1. In FIG. 3, means are provided for independent control of the forward suspension devices and the rear suspension devices. More specifically, fluid conduits 324 and 325 connect the forward suspension devices (not shown) with pressure control devices 326 and 327. Fluid conduit 356, which corresponds to fluid conduit 56 of FIG. 1, is shown in FIG. 3 as receiving fluid under pressure independently of the rear suspension devices. Thus, fluid conduit 356 is connected to receive fluid under pressure from a pump 362 through a conduit 364 and a valve 366, valve 366 being controlled by a lever 368.

In like manner, fluid conduits 328 and 330 connect the rear suspension devices (not shown) with pressure control devices 332 and 334. Fluid conduit 358 of FIG. 3 corresponds to fluid conduit 58 of FIG. 1. However, as aforesaid, the embodiment shown in FIG. 3 differs from that of FIG. 1 in that the rear suspension devices are controlled independently of the front devices. Toward that end, conduit 358 is connected to receive fluid under pressure from the pump or source 362 by way of conduits 364 and 364′, and valve 366′.

Operation

For a discussion of the operation, reference will be made primarily to FIGS. 4 and 5. FIG. 4 shows a dimension XP which is the exposed portion of the piston rod, and a dimension H which is the space between the top of piston 13 and the cylinder head. In the present case, dimension XP is assumed to be equal to dimension H.

FIG. 5 shows two curves in which the net load on the suspension device is plotted in terms of a unit "y" against dimension XP expressed in terms of a unit "x." The actual values of $x$ and $y$ will be determined by the load, size of the suspension device, pressures in the spaces 14 and 20 of the suspension device, operating conditions, and the like, as will be well understood by those skilled in the art.

It will be apparent from the foregoing that the truck will operate empty with pistons 38, 40, 52 and 54 (FIG. 1) fully retracted against their partitions 36 and 46, giving suspension pistons 13 a maximum volume of gas to compress. When the truck is loaded or is to be loaded, handle 68 is manipulated to admit oil under pressure from tank 74 to passages 42 and 48 (FIG. 1) and move pistons 38, 40, 52 and 54 outward as far as possible, thus giving suspension pistons 13 a minimum volume of gas to compress. The chambers (cylinders) in which pistons 38 etc. move thus control the pressure in their respective load-supporting chambers 14 and, through such pressure control, control the ride, so may properly be referred to as ride-control chambers.

In one size of off-highway truck as actually made, the rated payload comes close to being twice the weight of the empty truck. For the purpose of illustrating the advantages of the invention here disclosed and claimed, it will be assumed that the ratio is two to one. Referring now to FIG. 5, let it be assumed that the net suspension load is 6y for a fully loaded truck. The curve L in FIG. 5 shows the relationship between net suspension load and exposed piston rod with pistons 52 and 54 (FIG. 1) moved out to the ends of cylinders 32 and 34 respectively. The curve U illustrates the relationship of the net suspension load to exposed piston rod with pistons 52 and 54 fully retracted so that the volume above each piston 13 is approximately double what the volume would be with pistons 52 and 54 moved out to the ends of cylinders 32 and 34, for a given value of XP and static conditions.

Let it now be assumed that the loaded truck imposes a net load of 6y on each suspension device 10. If the truck were not provided with this invention, to determine the conditions with the truck empty, it would be necessary to move downward on curve L, FIG. 5, to the point E, where curve L crosses 2y (because 2y is one-third of 6y and it is assumed that the payload is twice the empty weight of the truck). The spring rate for the truck empty would therefore be determined by the slope of curve L at point E. Let it now be assumed that the truck suspension system is provided with the invention here disclosed and claimed, in which case it is necessary to move to the left on the graph of FIG. 5 along the constant net load line 2y to the point EE where 2y intersects curve U. By comparing the slope of curve U at the point EE with the slope of curve L at the point E, it can be seen that the spring rate for an empty truck provided with this invention is roughly half the spring rate for an empty truck having an oleo-pneumatic suspension device but not provided with this invention.

From the above description of the operation of the embodiment shown in FIGS. 1 and 2, it will be evident that closer control of the truck ride can be obtained by independent control of the front and rear suspensions, as provided in the embodiment of FIG. 3.

To those skilled in the art, it will appear from a careful consideration of the foregoing that loading of the truck without changing the position of ride-control pistons 38 etc. shortens the dimensions XP and H, increases the pressure in load-supporting chamber 14 of each suspension device, and decreases the pressure in chambers 19 and 20 of each suspension device. When the operator then opens valve 66 to admit incompressible fluid to cylinders 26, 27, 32 and 34 and move floating pistons 38, 40, 52 and 54, respectively, outward to the closed ends of their respective cylinders, his action has the effect of lifting the truck back up again from the position to which it had "settled" by application of the load.

The system can be calculated and designed to restore the loaded truck to substantially the same road clearance it had unloaded. By restoring the original road clearance, the operator restores the suspension pistons 13 to their former position in their cylinders and thus restores the pressure in chambers 19 and 20 to what it was before the truck was loaded; meanwhile, of course, the pressure in each load-supporting chamber 14 has been increased over what it was before the truck was loaded but also over what it was after the truck was loaded and before pistons 38, 40, 52 and 54 were moved out against their respective cylinder heads.

It will be apparent from the foregoing that this invention provides means to control the spring rate to provide a more desirable ride for an off-highway truck, whether the truck be loaded or empty.

While there are in this application specifically described a plurality of forms which the invention may assume in practice, it will be understood that these forms are shown for purposes of illustration and that the invention may be modified and embodied in various other forms without departing from its spirit or the scope of the appended claims.

What is claimed is:

1. In a vehicle having a basic supporting structure, a pair of front wheels, a pair of rear wheels, and suspension devices mounting the wheels on said structure, each of said devices having a load-supporting expansible chamber charged with a compressible fluid, the improvement comprising:

ride control means for the front wheels having a closed cylinder with a partition between its closed ends and a floating piston between the partition and each closed end, each said piston in contact with the compressible fluid, other ride control means for the rear wheels having a closed cylinder with a partition between its closed ends and a floating piston between the partition and each closed end, each said piston in contact with the compressible fluid, fluid conduit means connecting the closed ends of the first-named ride control means with the load supporting chambers for the front wheels, additional fluid conduit means connecting the closed ends of said other ride-control means with the load supporting chambers for the rear wheels, a source of incompressible fluid under pressure, and means to conduct incompressible fluid from said source to the ride-control means into contact with the floating pistons to move the floating pistons to the closed ends of their respective cylinders.

2. The combination according to claim 1, wherein the last-mentioned means includes valve means for selectively directing incompressible fluid simultaneously to both ride control means and exclusively to either ride control means.

3. In combination with a vehicle having a given weight when empty and capable of carrying a rated payload:

an oleopneumatic suspension unit of the piston-and-cylinder type defining a load-supporting expansible chamber attached between the sprung and unsprung portions of the vehicle, said load-supporting chamber being charged with a compressible fluid under pressure, a ride-control chamber consisting of a cylindrical enclosure mounted on said sprung portion and having one end in fluid communication with said load-supporting chamber, a free floating piston reciprocable within said enclosure between a first position adjacent said one end wherein the volume of said enclosure in communication with said load-supporting chamber is a minimum and a second position adjacent the opposite end of said enclosure wherein said enclosure volume is a maximum, said enclosure having a size such that the ratio of the sum of said maximum enclosure volume and the volume of said load-supporting chamber when the vehicle is empty to said load-supporting chamber volume alone is substantially equal to the ratio of the rated payload to said given weight, and means connected to said opposite end of said enclosure for admitting liquid under pressure for moving the floating piston to said first position when the vehicle is carrying its rated payload and for exhausting said liquid to allow said piston to move to said second position when the vehicle is empty.

References Cited by the Examiner

UNITED STATES PATENTS

| 2,134,515 | 10/1938 | Hoskyns | 280—124 |
| 2,577,761 | 12/1951 | Hickman. | |
| 2,913,254 | 11/1959 | Ruhl. | |
| 2,914,337 | 11/1959 | Kress | 280—96.2 |
| 3,062,330 | 11/1962 | Lyon | 267—64 X |
| 3,065,976 | 11/1962 | Vogel | 267—64 X |

FOREIGN PATENTS 836,521    6/1960    Great Britain.

BENJAMIN HERSH, *Primary Examiner.*

A. HARRY LEVY, MILTON BUCHLER, *Examiners.*